(12) United States Patent
Hartweg et al.

(10) Patent No.: US 6,395,244 B1
(45) Date of Patent: May 28, 2002

(54) STORAGE CATALYST

(75) Inventors: Martin Hartweg, Erbach; Thomas Fetzer, Speyer; Bernd Morsbach, Ludwigshafen; Otto Kumberger, Mannheim, all of (DE)

(73) Assignees: DaimlerChrysler AG, Stuttgart; BASF Aktiengesellschaft, Ludwigshaften, both of (DE)

( * ) Notice: Subject to any disclaimer, the term of this patent is extended or adjusted under 35 U.S.C. 154(b) by 0 days.

(21) Appl. No.: 09/445,775

(22) PCT Filed: May 30, 1998

(86) PCT No.: PCT/EP98/03252
§ 371 (c)(1),
(2), (4) Date: Feb. 24, 2000

(87) PCT Pub. No.: WO98/56492
PCT Pub. Date: Dec. 17, 1998

(30) Foreign Application Priority Data

Jun. 11, 1997 (DE) .......................................... 197 24 545

(51) Int. Cl.$^7$ .............................. B01J 8/00; B01J 29/06; B01J 23/02; B01D 47/00; C01B 21/00

(52) U.S. Cl. ................. 423/239.1; 423/210; 423/213.2; 423/235; 423/239.2; 423/245.3; 423/247; 502/63; 502/64; 502/73; 502/342; 502/346; 502/524

(58) Field of Search ........................... 423/213.2, 239.1, 423/245.3, 247, 235, 210, 239.2; 502/64, 63, 73, 342, 346, 524

(56) References Cited

U.S. PATENT DOCUMENTS 5,580,534 A * 12/1996 Hartweg et al. ......... 423/239.2
5,736,114 A    4/1998 Barthe et al. ............ 423/213.2
5,965,098 A   10/1999 Boegner et al. ......... 423/213.5
6,004,520 A   12/1999 Hartweg et al. ........ 423/213.2
6,027,703 A *  2/2000 Hartweg et al. ........ 423/213.2

FOREIGN PATENT DOCUMENTS

| EP | 0210681 A1 | 2/1987 | |
| EP | 0614692 A1 * | 9/1994 | ........... B01D/53/36 |
| EP | 0664147 A2 | 7/1995 | |
| EP | 0685253 A1 | 12/1995 | |
| EP | 0791390 A1 | 8/1997 | |
| JP | 49120869 A * | 11/1974 | |
| JP | 08182928 A * | 7/1996 | |
| WO | WO 94/04258 | 3/1994 | |

OTHER PUBLICATIONS

Copy of the Specification and Official Filing Receipt of patent application serial No. 09/392,648 filed on Sep. 9, 1999.

* cited by examiner

*Primary Examiner*—Steven P. Griffin
*Assistant Examiner*—Jonas N. Strickland
(74) *Attorney, Agent, or Firm*—Crowell & Moring LLP

(57) ABSTRACT

A storage catalyst includes (1) a component that has a catalytic reducing action for nitrogen oxides at least in the presence of hydrocarbons, and (2) a component that stores NOx at least at temperatures of below 100° C. The catalytically active component is of the general chemical formula $A_aB_bO_4$, where A is one or more divalent metals and B is one or more trivalent metals, and where $a+b \leq 3$ and $a, b > 0$. The reaction enthalpy or the chemical activity between the catalytically active component and the NOx-storing component is low at least up to temperatures of 600° C.

31 Claims, 10 Drawing Sheets

STORAGE CATALYST

BACKGROUND AND SUMMARY OF THE INVENTION

The invention relates to a storage catalyst.

WO 97/02886, which forms the basis of the generic introduction, has disclosed a storage catalyst for reduction of nitrogen oxides ($NO_x$) in exhaust gases from lean-mix engines, which contains a component which stores $NO_x$ and a component which catalytically reduces $NO_x$. The catalytically active component and the storing component are applied to a support body at least substantially separately from one another. The component which catalytically reduces the $NO_x$ is at least one element from the platinum group which is arranged separately from the component which stores the $NO_x$. The component which stores the $NO_x$ comprises one or more materials from the group consisting of metal oxides, metal hydroxides, metal carbonates and mixed metal oxides, the appropriate metal in each case being lithium, sodium, potassium, rubidium, caesium, magnesium, calcium, strontium and/or barium.

In operation, particularly in the presence of oxygen, such storage catalysts—which preferably contain platinum and a barium compound—are subjected to high thermal loads and, especially at temperatures above 600° C., experience rapid ageing. However, such conditions are experienced during the release of the $NO_x$ which has previously been held in place and during the regeneration of sulphate poisoning, and consequently known storage catalysts have a relatively short service life.

A further storage catalyst for lean-mix engines is known, for example, from EP 562,805 A1. This storage catalyst is a transition metal/zeolite catalyst in which the transition metal has been introduced into the zeolite support body by means of ion exchange. Furthermore, this document has disclosed an exhaust system for lean-mix engines, and an engine control unit which is required in order to reduce the level of pollutants.

The object of the invention is to further develop the storage catalyst on which the generic introduction is based in such a manner that its thermal ageing is reduced. It is intended that the storage catalyst should exhibit this reduced ageing in particular when used in exhaust pipes of internal-combustion engines which are operated in a mixed lean-burn/rich mode, and particularly preferably during temperature adjustment.

The object is achieved, with a storage catalyst according to the present invention. Due to the novel combination of the catalytically active component and the $NO_x$-storing component with a low level of chemical activity with respect to one another at elevated temperatures (higher than 600° C., in particular higher than 800° C.), the storage catalyst according to the invention has a long service life even at these temperatures. Furthermore, it is also less expensive to produce, partly because precious metals are at least substantially eliminated.

Useful refinements to the invention can be found in the subclaims. Furthermore, the invention is explained in more detail with reference to exemplary embodiments which are illustrated in the figures, in which:

DETAILED DESCRIPTION OF THE DRAWINGS

Figure 1:
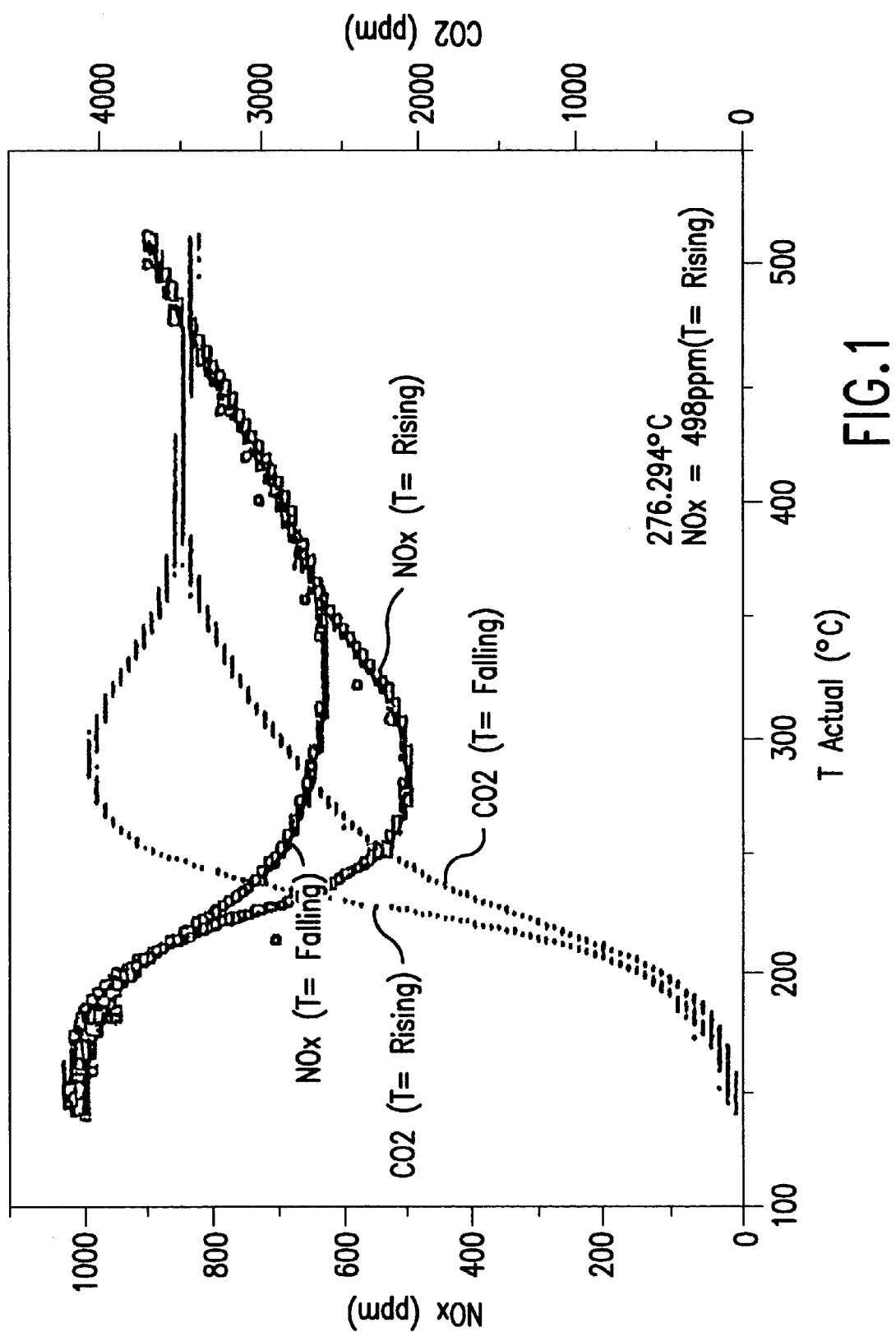
FIG. 1 shows a $NO_x/CO_2$ diagram as a function of the temperature of a $CuAl_2O_4$-containing catalytically active component which has a spinel structure.

In the following examples, the catalytically active component is at the same time used as a support material for the NOx-storing component. In all cases, the active component is a spinel; in the sense of the invention, a spinel is to be understood as meaning a material of the general chemical formula $A_aB_bO_4$ which, at least at a microscopic level, has a crystallographic or crystal-like cubic lattice structure with a face-centred arrangement of oxygen ions and tetrahedral and octahedral interstices, in which tetrahedral interstices the A particles and up to 50% of the B particles are arranged, and in which octahedral interstices the remaining B particles are arranged. In this context an A or B particle merely indicates the crystallographic arrangement thereof.

In the sense of the invention, spinels are also to be regarded as including substoichiometric compounds and/or compositions in which the $B_bO_3$ functions as a matrix and which in the X-ray spectrum have the characteristic spinel lines, the spinel of the formal composition $A_aB_bO_4$ being present in a $B_bO_3$ matrix, resulting in a formal stoichiometry of $A_a(1-x)B_bO_4$. In terms of materials, the A particles, as well as the B particles, may differ from one another.

In the spinels which are used as support material and as catalytically active component, the A particle is one or more of the elements from the A group consisting of Mg, Ca, Mn, Fe, Ni, Co, Cu, Zn, Sn and Ti, and the B particle is one or more elements from the B group consisting of Al, Ga, In, Co, Fe, Cr, Mn, Cu, Zn, Sn, Ti and Ni. However, it should be ensured that none of the elements from the exclusive group consisting of Mn, Fe and Co may simultaneously be both an A particle and a B particle.

In this context, the following compositions, which are at least similar to a spinel, have proven particularly advantageous: $(MgCu)Al_2O_4$, $(CuCu)Al_2O_4$, $(CuZn)Al_2O_4$, $(CoZn)CuAl_2O_4$, mixtures of $(ZnCu)Al_2O_4$ with $WO_3$ and/or $V_2O_5$ and/or $TiO_2$ and, in particular, in the composition $Mg_{0.5}Cu_{0.5}Al_2O_4$, $Cu_{0.5}Cu_{0.5}Al_2O_4$, $Cu_{0.5}Zn_{0.5}Al_2O_4$, $Co_{0.25}Zn_{0.25}Cu_{0.5}Al_2O_4$, or mixtures thereof with 10% $WO_3$ and 6% $V_2O_5$ and/or 84% $TiO_2$ and/or $Al_2O_3$.

Furthermore, in some cases it may be advantageous for the catalytically active component additionally to be provided with further catalytically active elements, in particular with palladium, platinum, rhodium, ruthenium, osmium, iridium, rhenium and/or rare-earth elements, such as lanthanum and cerium, vanadium, titanium, niobium, molybdenum, tungsten and/or their salts and/or their oxides.

The following examples provide more detailed descriptions of some of these materials which have just been mentioned or combinations thereof, by way of example.

EXAMPLE 1

The spinel used is a copper-impregnated copper/aluminium spinel, in particular of the composition $Cu_{0.5}Cu_{0.5}Al_2O_4$. The spinel is produced using a process as known from DE 43 01 470 A1. To record a $NO_x/CO_2$ diagram as a function of the temperature, 10 grams of chips of the Cu-impregnated $CuAl_2O_4$ spinel were placed in a vertically positioned quartz reactor (diameter 20 mm, height approx. 500 mm), in the centre of which a gas-permeable frit is arranged in order to expose the sample. The bed height was about 15 mm. A furnace which heats the centre part of the reactor over a length of approx. 100 mm is arranged around the quartz reactor; it is possible to reach temperatures of up to 550° C.

A gas mixture was guided through the support material at a rate of approx. 10,000 per hour, the gas mixture comprising 1000 ppm NO, 1000 ppm propene, 10% oxygen, remainder argon as carrier gas. Downstream of the reactor, the NO concentration was measured using a gas detector; prior to detection, any $NO_2$ which had formed was reduced to form the nitrogen oxide NO in a converter. At the same time, oxidation of hydrocarbons to form $CO_2$ was observed by the gas detector by measuring the $CO_2$ content.

The results of the measurement of the $Cu_{0.5}Cu_{0.5}Al_2O_4$ spinel in accordance with Example 1 are shown in FIG. 1. The diagram shows the curve of the NO level and the $CO_2$ level as a function of temperature. The results show a clear fall in the $NO_x$(NO) concentration as the temperature rises, reaching a low point at between approx. 276 and 294° C. and then rising again. For the Cu-impregnated $CuAl_2O_4$, a drastic fall in the $NO_x$ concentration is observed beyond approx. 200° C., while at the same time the hydrocarbons are decomposed to form $CO_2$, as shown by the increase in the $CO_2$ concentration. The temperature window in which reduction of the $NO_x$ takes place is between 200° C. and 400° C., depending on the composition of the material.

Since in the following Examples 2 to 7, the measurement process employed is similar to that used in Example 1, only the differences which emerge are described in Examples 2 to 7.

EXAMPLE 2

The spinel used is a magnesium/copper/aluminium spinel, in particular of the composition $Mg_{0.5}Cu_{0.5}Al_2O_4$. The spinel is advantageously produced in accordance with a process as is known from DE 43 01 470 A1.

Figure 2:
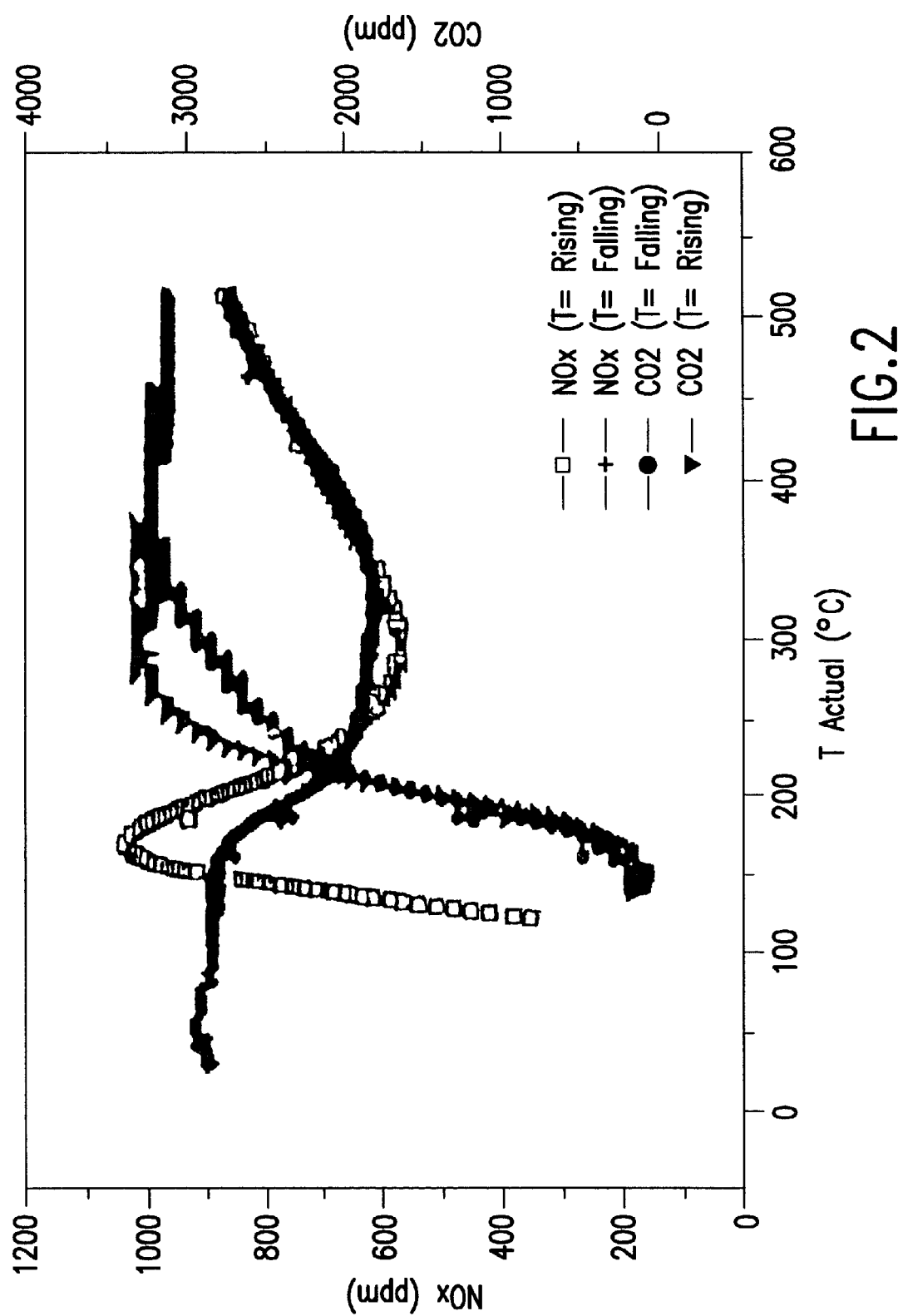
FIG. 2 shows a diagram of a $NO_x(NO)$ reduction and CO oxidation against temperature, with an $Mg_{0.5}Cu_{0.5}Al_2O_4$-containing catalytically active component which has a spinel structure.

The results of the measurement of the $Mg_{0.5}Cu_{0.5}Al_2O_4$ spinel in accordance with Example 2 are shown in FIG. 2. The results indicate that there is a clear fall in the NO concentration as the temperature rises, reaching a low point at approx. 320° C.

EXAMPLE 3

The catalytically active component used is a mixture which has a spinel structure and a composition comprising 20% ZnO, 16% CuO and 64% $Al_2O_3$— referred to in the following Examples 3 to 7 as $ZnCuAl_2O_4$ spinel for purposes of simplification—and which is impregnated with 1.6% by weight of $CeO_2$.

Figure 3:
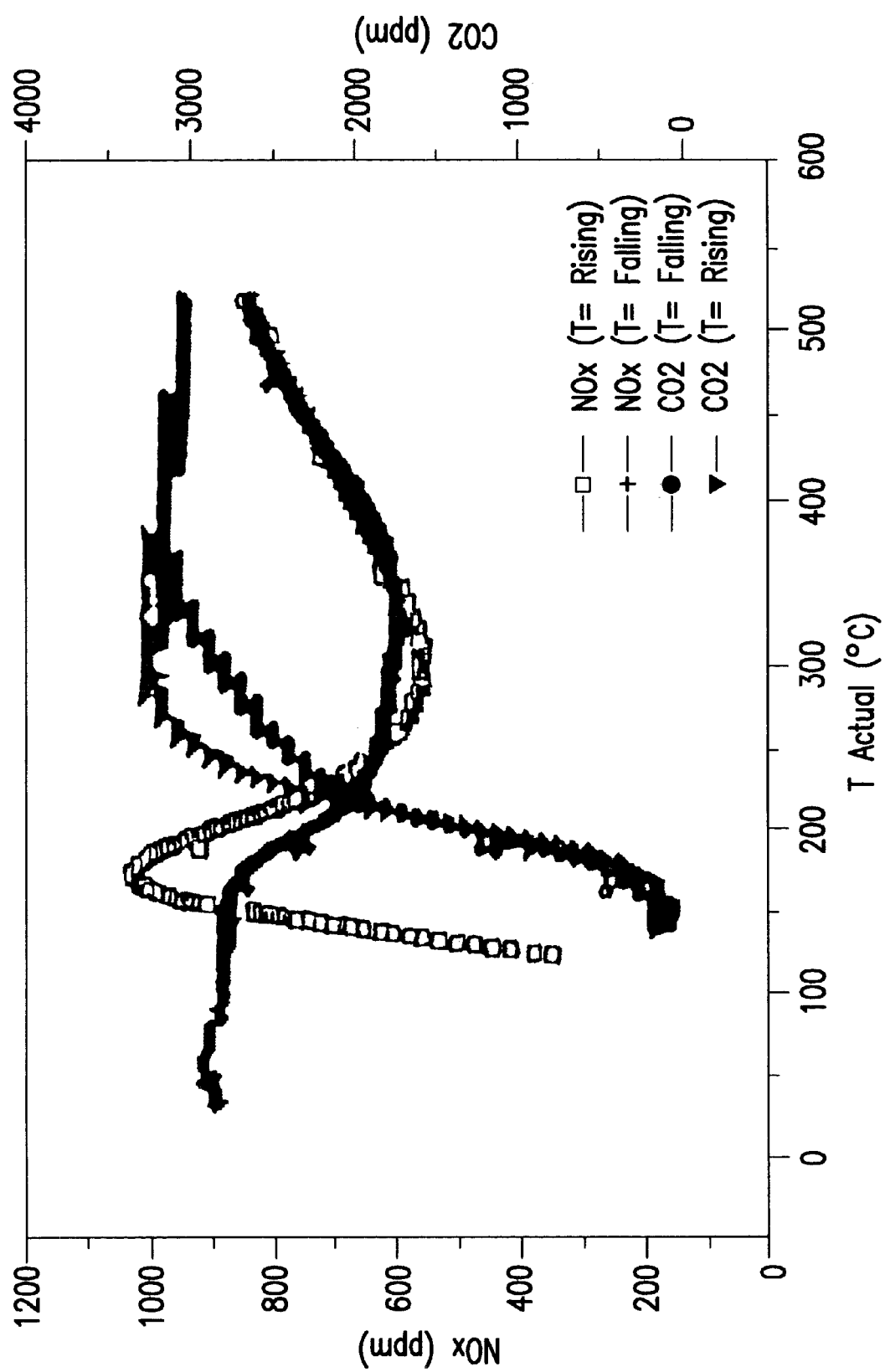
FIG. 3 shows a diagram of a $NO_x(NO)$ reduction against temperature with a catalytically active component which contains 20% ZnO, 16% CuO and 64% $Al_2O_3$, has a spinel structure and is additionally impregnated with 1.6% by weight $CeO_2$.

The results of the measurement carried out on the $ZnCuAl_2O_4$ spinel in accordance with Example 3 are shown in FIG. 3. The results show a clear fall in the $NO_x$(NO) concentration as the temperature rises, reaching a low point at approx. 430° C. and then rising again. For the $ZnCuAl_2O_4$ spinel+1.6% by weight $CeO_2$, a drastic fall in the $NO_x$ concentration is observed beyond approx. 150° C., while at the same time the hydrocarbons are decomposed to form $CO_2$, as shown by the increase in the $CO_2$ concentration. The temperature window in which reduction of the $NO_x$ takes place is between 150° C. and 500° C., depending on the composition of the material.

EXAMPLE 4

The spinel used is a $ZnCuAl_2O_4$ spinel as above which additionally contains 8% by weight of $CeO_2$. To produce this spinel, starting from a $ZnCuAl_2O_4$ spinel, the spinel is impregnated with 8% by weight of $CeO_2$.

Figure 4:
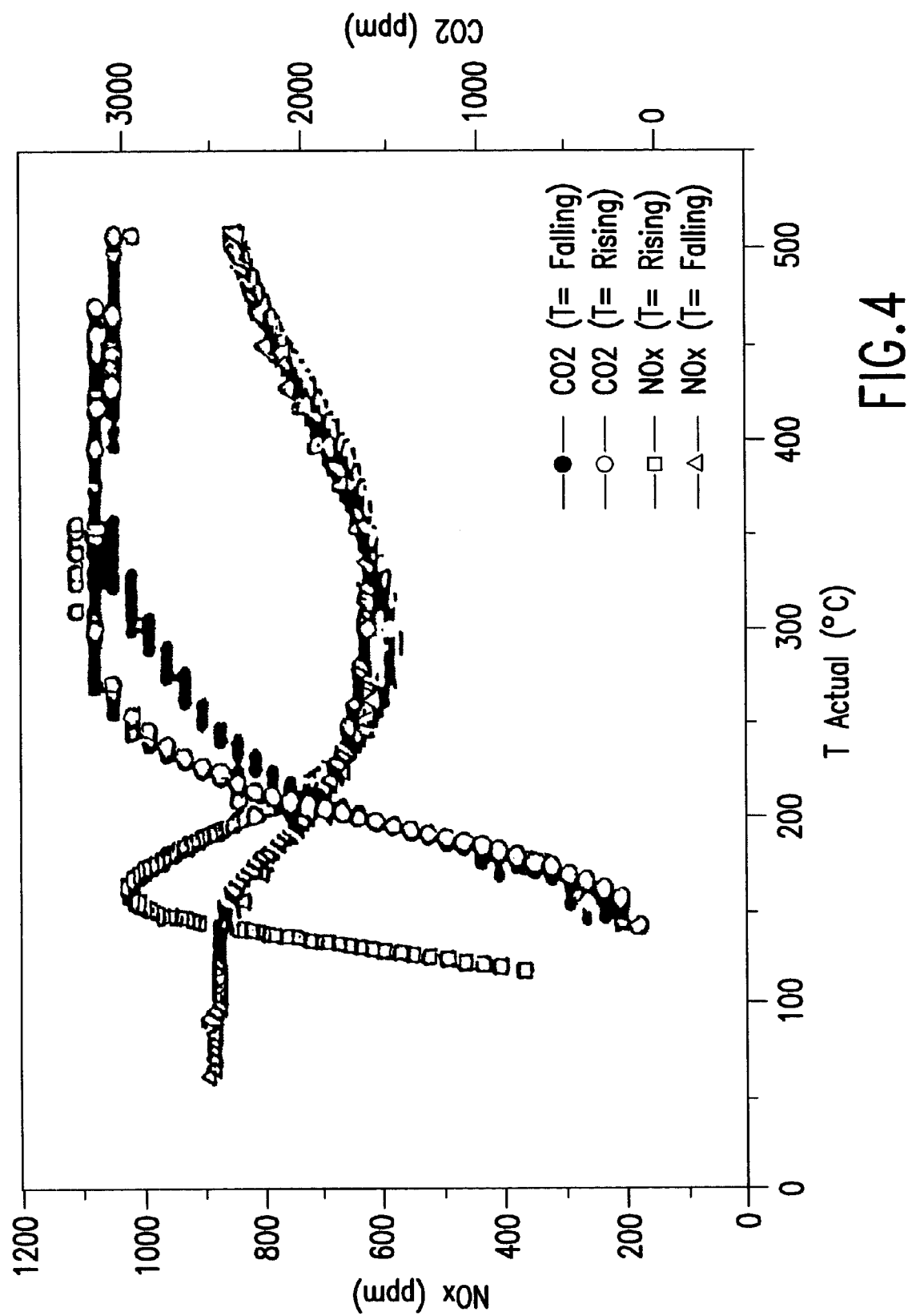
FIG. 4 shows a diagram of a NOx(NO) reduction against temperature with a catalytically active component which contains 20% ZnO, 16% CuO and 64% $Al_2O_3$, has a spinel structure and is additionally impregnated with 8% by weight $CeO_2$.

The results of the measurement of the $ZnCuAl_2O_4$ spinel impregnated with 8% by weight of $CeO_2$ in accordance with Example 4 are shown in FIG. 4. The results show a clear fall in the $NO_x$(NO) concentration at rising temperature, reaching a low point at approx. 300° C. and then rising again.

For the $ZnCuAl_2O_4$ spinel+8% by weight of $CeO_2$, a drastic fall in the $NO_x$ concentration is observed beyond approx. 200° C., while at the same time the hydrocarbons are converted to form $CO_2$, as shown by the increase in the $CO_2$ concentration. The temperature window in which reduction of the $NO_x$ takes place is between 200° C. and 500° C., depending on the composition of the material.

EXAMPLE 5

The spinel used for the support material is the abovementioned $ZnCuAl_2O_4$ spinel, which this time is mixed with the oxides of tungsten, vanadium and titanium. The $ZnCuAl_2O_4$ spinel forms 50% by weight of the mixture, the remaining 50% by weight of the mixture being formed from 5% by weight $WO_3$, 3% by weight $V_2O_5$ and 42% by weight $TiO_2$.

Figure 5:
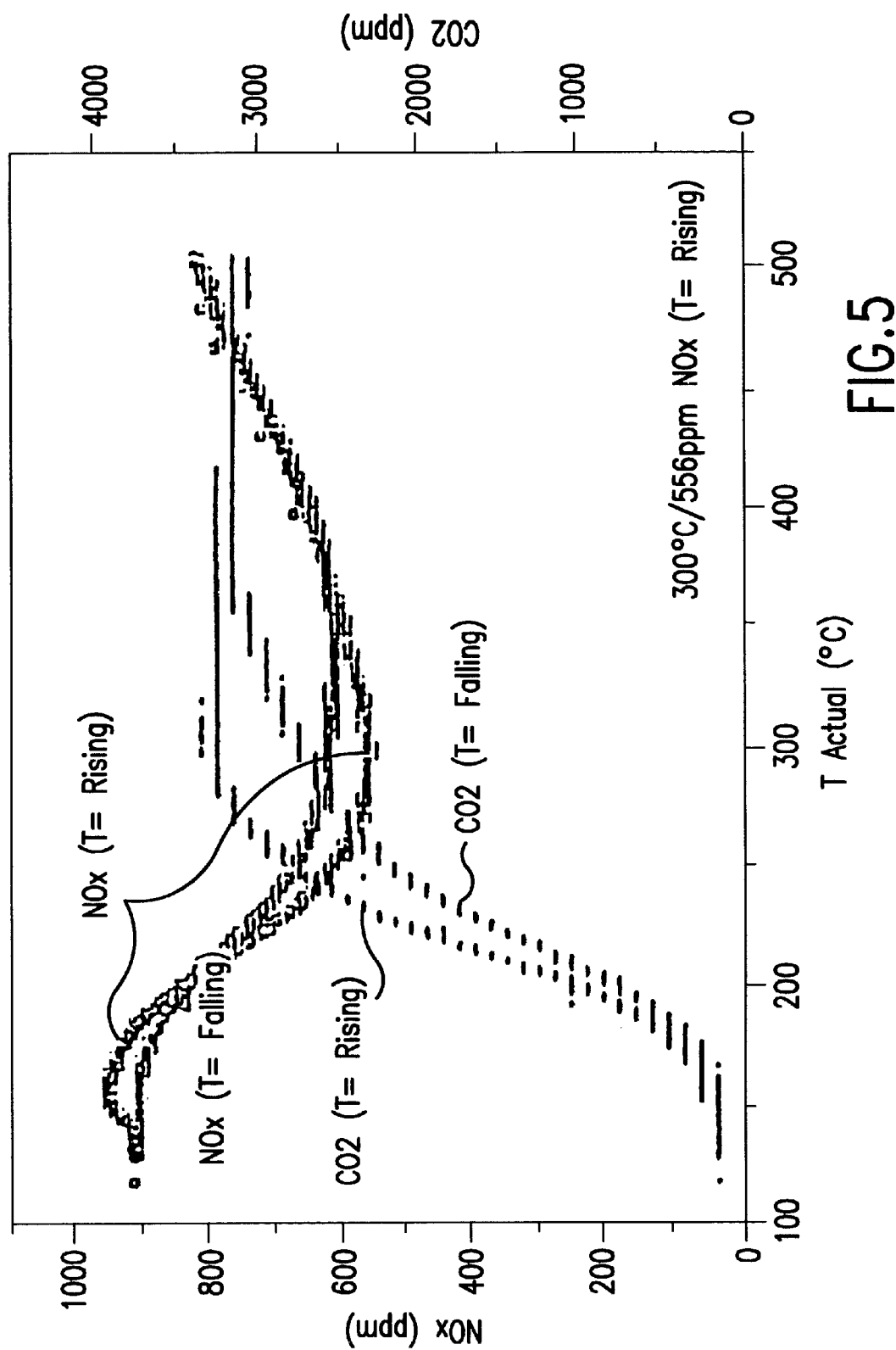
FIG. 5 shows a diagram of a NOx(NO) reduction against temperature with a catalytically active component which contains 20% ZnO, 16% CuO and 64% $Al_2O_3$, has a spinel structure and is additionally mixed with a solid body containing $WO_3$, $V_2O_5$ and $TiO_2$.

The results of the measurement of the spinel in accordance with Example 5 are shown in FIG. 5. These results show a clear fall in the $NO_x$(NO) concentration as the temperature rises, reaching a low point at approx. 240° C. and then rising again.

For the mixture, a drastic fall in the NOx concentration is observed beyond approx. 150° C., while at the same time the hydrocarbons are decomposed to form $CO_2$, as shown by the increase in the $CO_2$ concentration. The temperature window in which reduction of the $NO_x$ takes place is between 150° C. and 500° C., depending on the composition of the material.

EXAMPLE 6

The spinel used for the support material is a $ZnCuAl_2O_4$ spinel of the known composition which is impregnated with 0.1% of vanadium.

Figure 6:
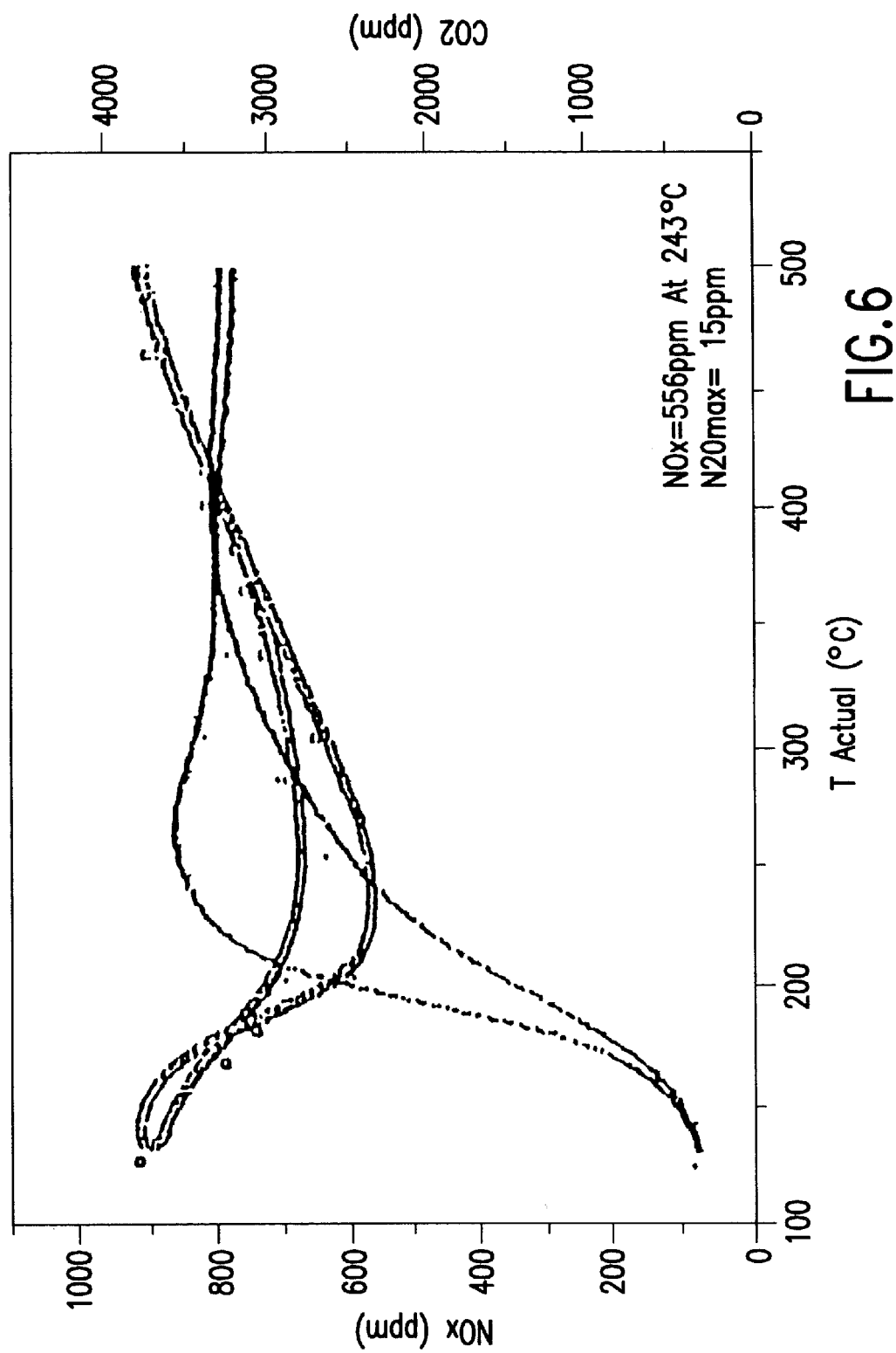
FIG. 6 shows a diagram of an NOx(NO) reduction against temperature with a catalytically active component which contains 20% ZnO, 16% CuO and 64% $Al_2O_3$, has a spinel structure and in addition contains 0.1% by weight of vanadium.

The results of the measurement of the spinel in accordance with Example 6 are shown in FIG. 6. The results show a clear fall in the $NO_x(NO)$ concentration as the temperature rises, reaching a low point at approx. 300° C. and then rising again.

For the $ZnCuAl_2O_4$ spinel+vanadium, a drastic fall in the $NO_x$ concentration is observed beyond approx. 170° C., while at the same time the hydrocarbons are decomposed to form $CO_2$, as shown by the increase in the $CO_2$ concentration. The temperature window in which reduction of the $NO_x$ takes place is between 170° C. and 500° C., depending on the composition of the material.

EXAMPLE 7

The spinel used for the support material is again the $ZnCuAl_2O_4$ spinel, which is impregnated with 0.5% of palladium.

Figure 7:
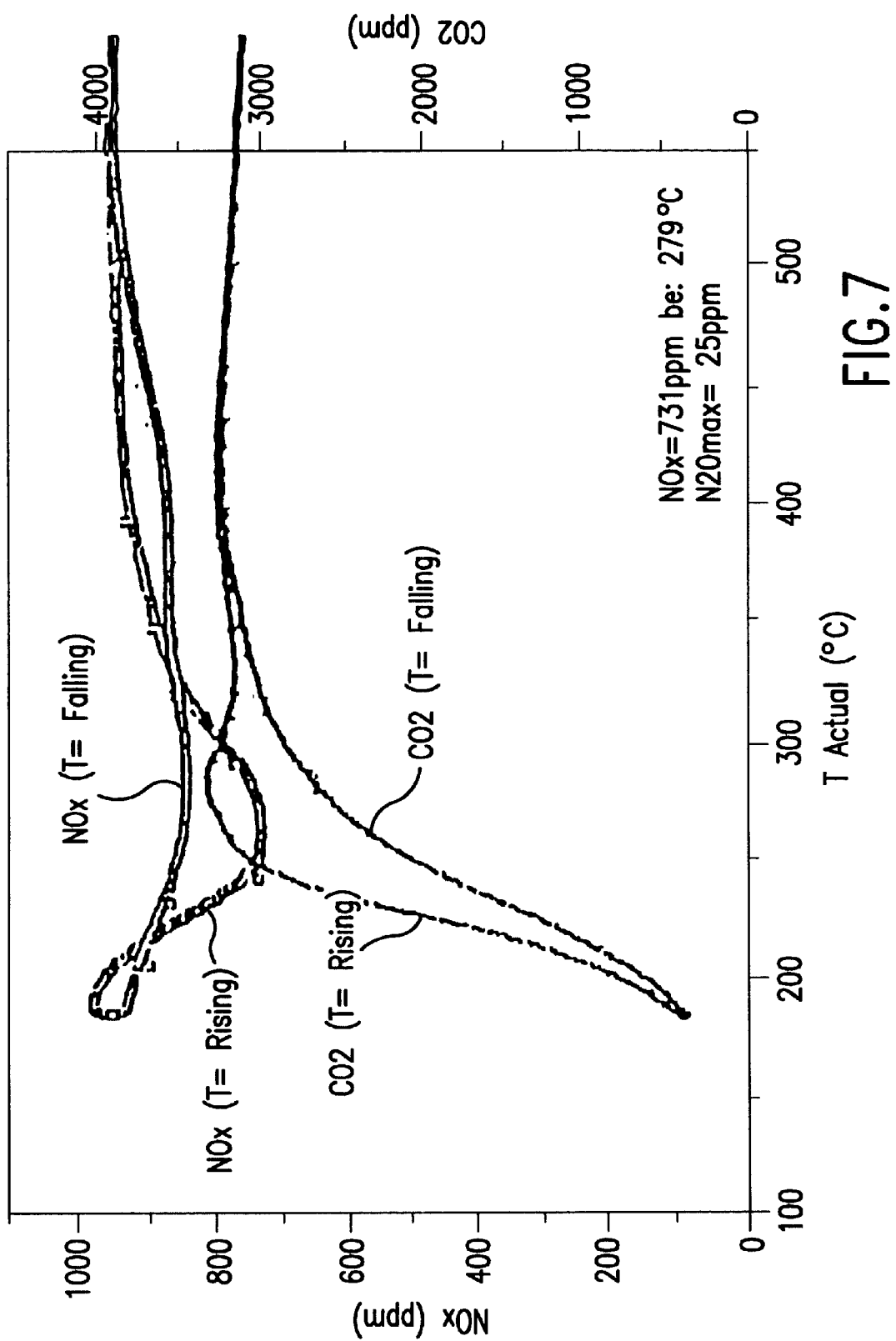
FIG. 7 shows a diagram of an NOx(NO) reduction against temperature with a catalytically active component which contains 20% ZnO, 16% CuO and 64% $Al_2O_3$, has a spinel structure and, in addition, contains 0.5% by weight of palladium.

The results of the measurement of the spinel in accordance with Example 7 are shown in FIG. 7. The results show a clear fall in the $NO_x(NO)$ concentration with increasing temperature, reaching a low point at approx. 280° C. and then rising again.

For the $ZnCuAl_2O_4$ spinel+0.5% by weight Pd, a drastic fall in the $NO_x$-concentration is observed beyond approx. 180° C., while at the same time the hydrocarbons are decomposed to form $CO_2$, as shown by the increase in the $CO_2$ concentration. The temperature window in which reduction of the $NO_x$ takes place is between 180° C. and 500° C., depending on the composition of the material.

EXAMPLE 8

The catalytically active component used is a silver-containing spinel of the general chemical formula $Ag.CuAl_2O_4$ which has been produced in accordance with a process which is known from WO 94/02244. The spinel has the property of storing $No_x(NO)$ in the nitrogen-oxide-containing gas at temperatures of below 145° C. and releasing it again at temperatures of above 145° C.

The fact that this process takes place even when the exhaust gas contains not insignificant amounts of water is of particular interest. This surprising effect is clear from the appended diagram shown in FIG. 8.

Figure 8:
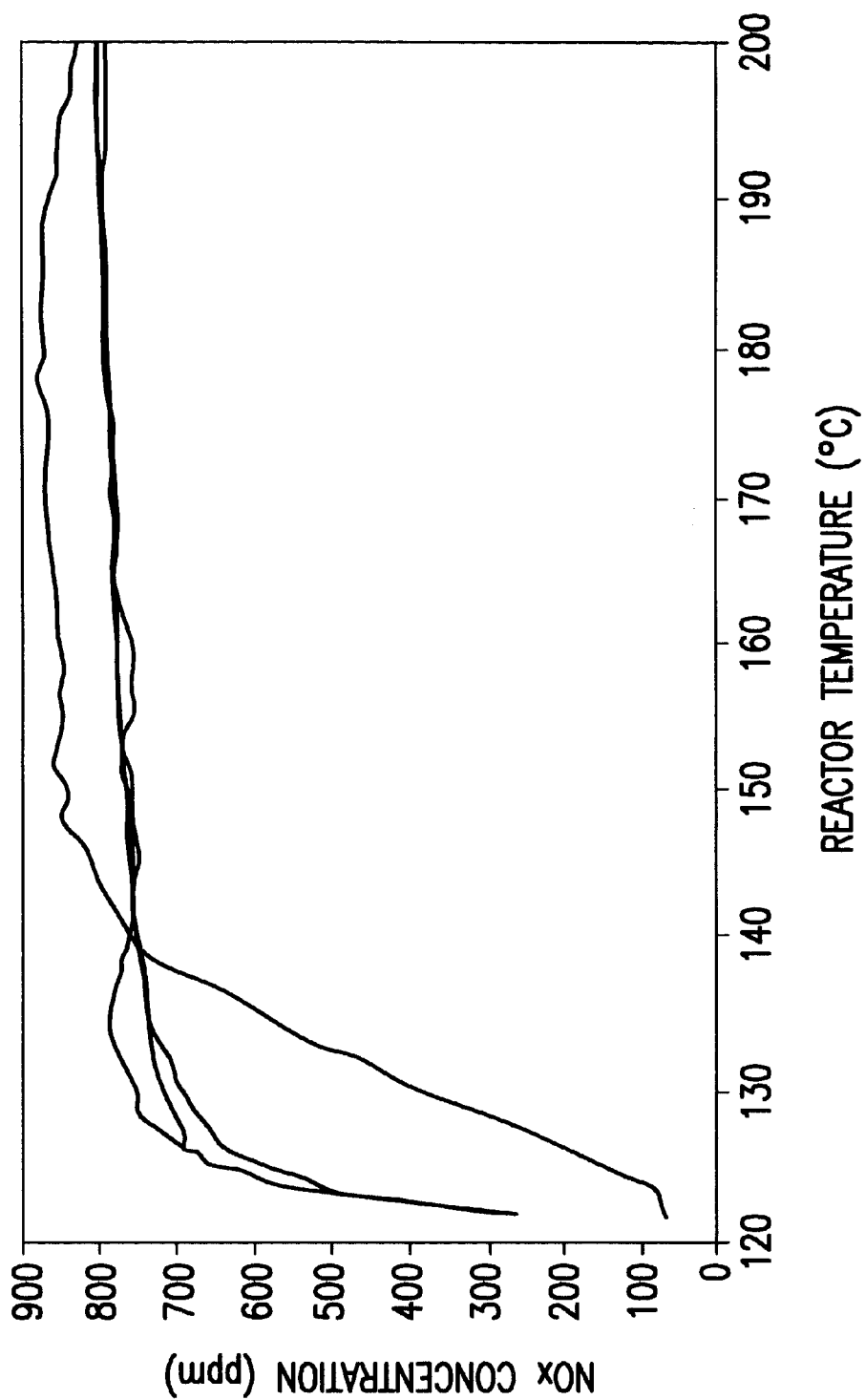
FIG. 8 shows a diagram of a NOx(NO) reduction against temperature with a catalytically active component which contains $Ag.CuAl_2O_4$ and has a spinel structure.

To measure the diagram shown in FIG. 8, the porous spinel which was extruded so as to form pellets was exposed, in a heatable reactor, to a gas flow of approx. 30,000 l/h. The composition of the gas was as follows: $Ar+800$ ppm $NO+800$ ppm $C_3H_6+10\%$ $O_2+8\%$ $H_2O$. The diagram, which for comparison purposes also shows the performance of other spinels in the presence of water, clearly indicates that NO is stored at temperatures of below 145° C. Furthermore, the rise in the NO concentration, at temperatures of above 145° C., to beyond the introduced level of 800 ppm NO shows that the NO which had previously been stored is released again. Since water is formed during combustion of fossil fuels, this property of spinel is of significant importance.

Further investigations carried out on the abovementioned spinels revealed a high ability to withstand $NO_x$, $H_2O$, $CO_2$ and $H_2O$.

EXAMPLE 9

The spinel used for the support material and for the catalytic component is a $ZnCuAl_2O_4$ spinel of the known composition, which is impregnated with 3.5% barium cuprate ($BaCuO_2$) as the storing component.

Figure 9:
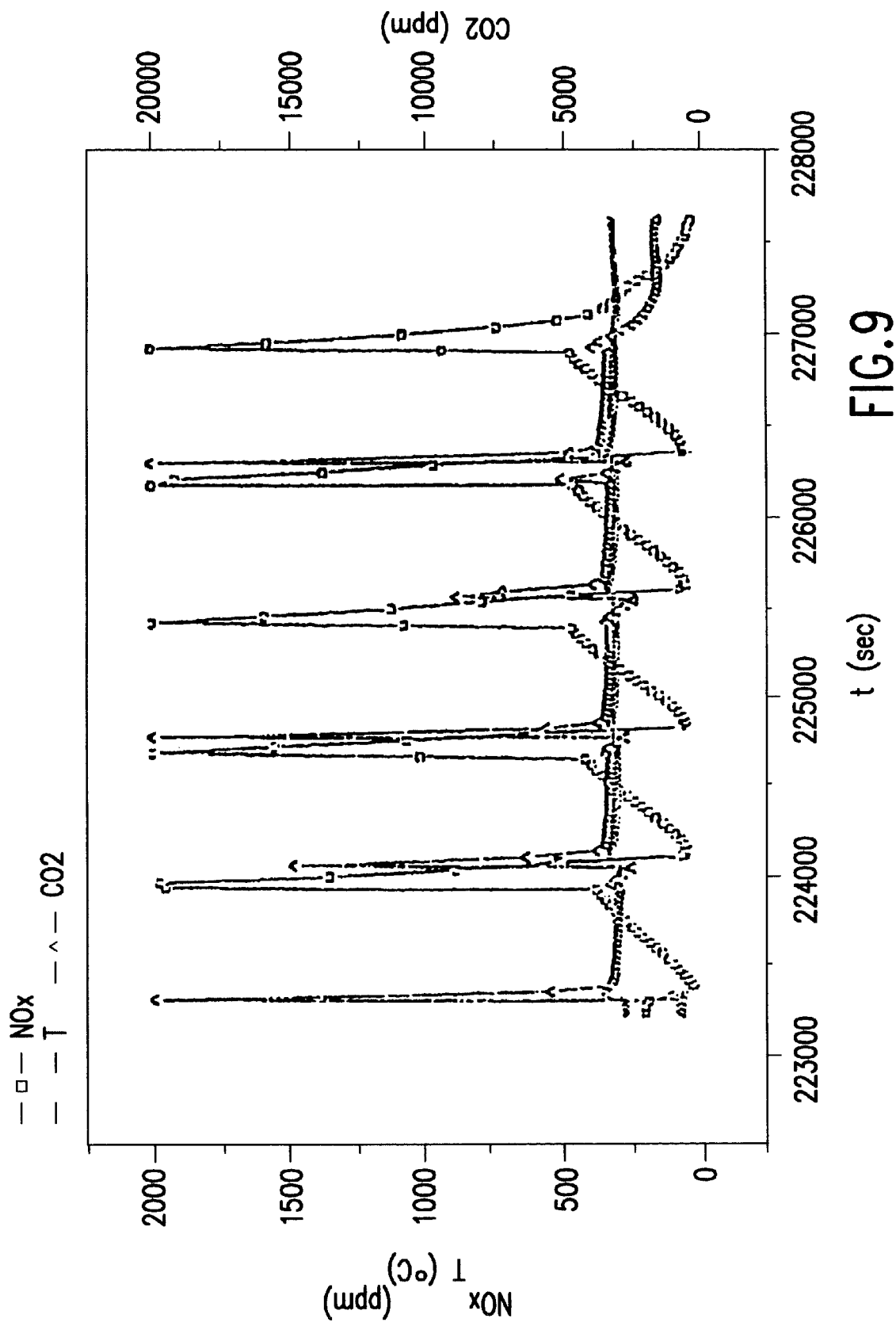
FIG. 9 shows a diagram of a dynamic NOx(NO) adsorption and $NO_x(NO)$ desorption against time with a catalytically active component which contains $ZnCuAl_2O_4$, has a spinel structure and, as the storing component, additionally contains 3.5% $BaCuO_2$.

The long-term performance of this storage catalyst was plotted against time in the diagram shown in FIG. 9. The temperature curve (measured points are denoted by the symbol "▽"), the $NO_x$ concentration curve (measured points are denoted by the symbol "□") and the $CO_2$ concentration curve (measured points are denoted by the symbol "Δ") are plotted in the diagram, with the $CO_2$ concentration on the right-hand axis and the temperature and the $NO_x$ concentration on the left-hand axis.

The measurement was carried out during a long-term test and shows the abovementioned curves in the time from 223,000 s to 228,000 s, i.e. approx. 62 hours after the start of the long-term test. The test sequence was repeated periodically, with the storage catalyst always being heated to approx. 350° C.

During the adsorption phases, which lasted approx. 10 min, an oxygen-containing gas was introduced, corresponding to a lean-burn mode of a lean-mix engine. The composition of the gas was as follows: $Ar+1000$ ppm $NO+1000$ ppm $C_3H_6+10\%$ $O_2$.

During the desorption phases, in which the $NO_x$ which had previously been adsorbed is converted in an oxygen-free atmosphere, a gas which contained no oxygen but large amounts of hydrocarbons was introduced, corresponding to a rich mode of a lean-mix engine. The gas had the following composition: $Ar+1000$ ppm $NO+3000$ ppm $C_3H_6$.

The results of the measurement carried out on a novel storage catalyst in accordance with Example 9 are shown in FIG. 9 and indicated a total $NO_x$ conversion of over 80%.

In the diagram shown in FIG. 9, the desorption phase can be recognized from a rapid rise in the $CO_2$ concentration ($CO_2$ peak). The period between two $CO_2$ peaks is the adsorption phase, which lasts approx. 10 min.

In the present storage catalyst in accordance with Example 9, there is a gradual, constant rise in the $NO_x$ concentration during the adsorption phase, which indicates that the storage catalyst is saturated with $NO_x$. Therefore, when used on a large industrial scale, preferably in combustion power plants, and when used for cleaning exhaust gases, the adsorption phase with this composition of storage catalyst should be set at significantly shorter than 10 min.

At the end of the adsorption phase, the oxygen is disconnected and the propene concentration ($C_3H_6$), i.e. the concentration of hydrocarbons, is tripled. This measure initiates the desorption phase. During the desorption phase, the $NO_x$ which had previously been stored is released and then converted. The conversion can be recognized from the $CO_2$ peak which occurs during the desorption phase. The reaction which takes place during this process causes self-heating of the material of the storage catalyst.

At the start of the desorption phase, which lasts approx. 1 min, the $NO_x$ concentration rises steeply ($NO_x$ peak) shortly before the $CO_2$ peak, which indicates conversion of the $NO_x$. The $NO_x$ peak is based on low impregnation of the storage catalyst with hydrocarbons at the beginning of the desorption phase and can be attributed to the apparatus of the test installation.

EXAMPLE 10

The spinel used for the carrier material and for the catalytic component is a $ZnCUAl_2O_4$ spinel of the known composition, which is impregnated with 7% of barium cuprate ($BaCuO_2$).

Figure 10:
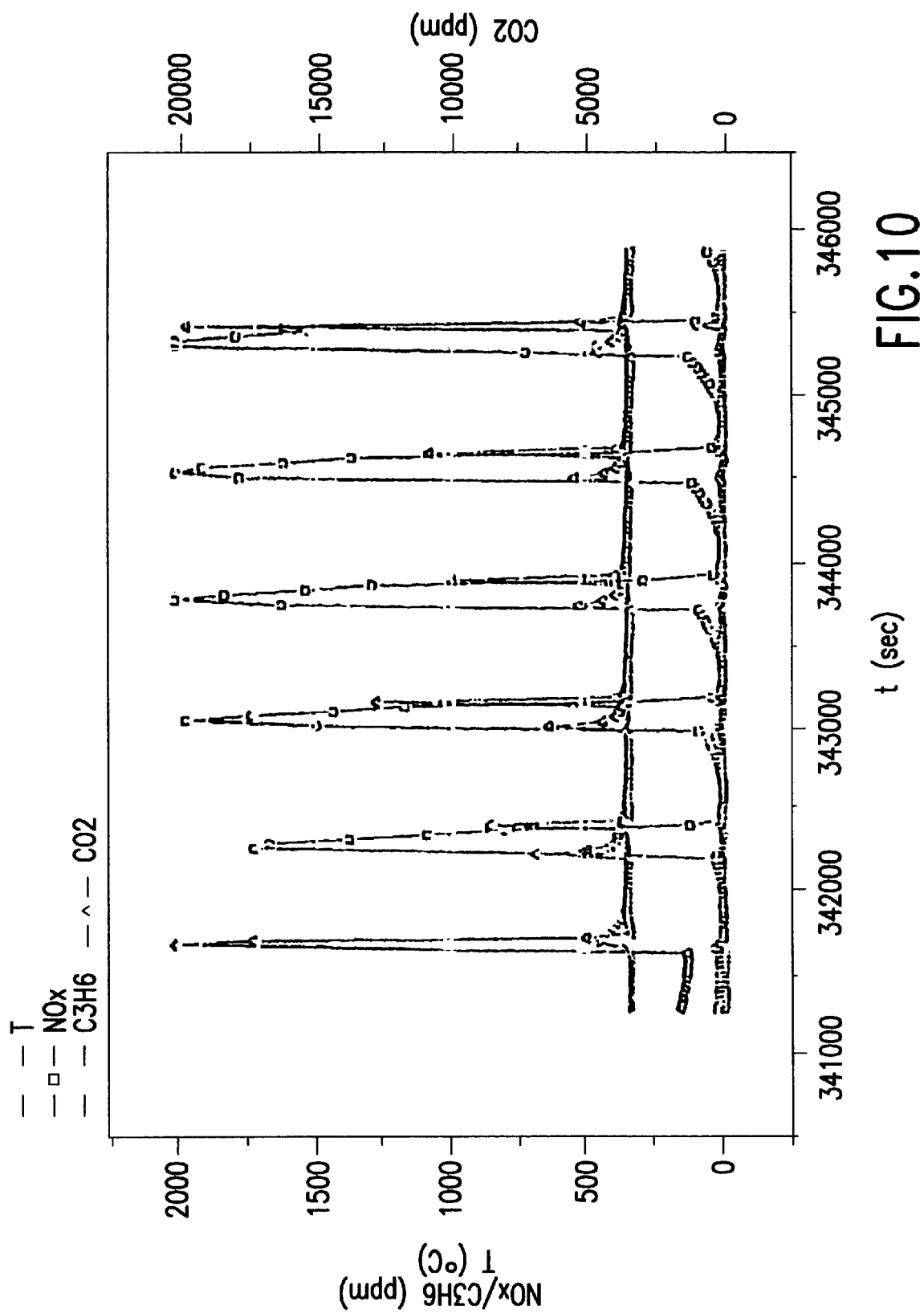
FIG. 10 shows a diagram of a dynamic NOx(NO) adsorption and $NO_x(NO)$ desorption against time with a catalytically active component which contains $ZnCuAl_2O_4$, has a spinel structure and, as the storing component, additionally contains 7% $BaCuO_2$.

The long-term performance of this storage catalyst was plotted against time in the diagram shown in FIG. 10. The temperature curve (measured points are denoted by the symbol "▽"), the $NO_x$ concentration curve (measured points are denoted by the symbol "□"), the $C_3H_6$ concentration curve (measured points are denoted by the symbol "○") and the $CO_2$ concentration curve (measured points are denoted by the symbol "Δ") are plotted in the diagram, with the $CO_2$ concentration on the right-hand axis and the temperature, the $NO_x$ concentration and the $C_3H_6$ concentration on the left-hand axis.

The measurement was carried out on the basis of a long-term test and shows the abovementioned curves in the time from 341,000 s to 346,000 s, i.e. approx. 95 hours after the beginning of the long-term test. The test procedure and parameters were the same as those given in Example 9, for which reason these are not discussed in more detail here.

The results of the measurement carried out on a novel storage catalyst in accordance with Example 10 are shown in FIG. 10. The desorption phase, which lasts about one minute, can also be recognized in the diagram in accordance with FIG. 10 from the steep rise in the $CO_2$ concentration ($CO_2$ peak). The adsorption phase which lies between two desorption phases again lasts about 10 minutes.

In the present storage catalyst in accordance with Example 10, there is at most a very slight rise in the $NO_x$ concentration during the adsorption phase. Therefore, during the adsorption phase, the increase in the amount of $BaCuO_2$ as the storing component reduces the $NO_x$ saturation of the storage catalyst, with the result that the maximum duration of the adsorption phase of this storage catalyst is prolonged compared to that of Example 9.

At the end of the adsorption phase, as in Example 9, the oxygen is disconnected, the propene concentration ($C_3H_6$) is increased and the desorption phase is initiated.

In this case too, a steep rise in the $NO_x$ concentration ($NO_x$ peak) takes place at the start of the desorption phase, shortly before the $CO_2$ peak. In this case too, the $NO_x$ peak results from an excessively low impregnation of the storage catalyst with hydrocarbons at the beginning of the desorption phase and can likewise be attributed to the apparatus of the test installation.

Since the storage catalysts which contain spinel according to the invention have a good long-term performance even at high temperatures, in view of this background they are also still suitable as so-called 3-way catalysts. A further application area is the cleaning of off-gases from combustion power plants.

What is claimed is:

1. A storage catalyst for an exhaust train, comprising:
   a catalytically active component for reducing nitrogen oxide at least in the presence of hydrocarbons and impregnated with a NOx-storing component comprising 3.5–7 wt. % barium cuprate;
   wherein said catalytically active component is of the general chemical formula $A_aB_bO_4$, wherein A is one or more divalent metals and B is one or more trivalent metals, and wherein $a+b \leq 3$ and a, b>0;
   wherein the catalytically active component, at least at a microscopic level, has a crystalline or crystal-like cubic lattice structure with a face-centered arrangement of oxygen ions and tetrahedral and octahedral interstices, in which tetrahedral interstices A and up to 50% of B are arranged, and wherein the octahedral interstices the remaining B is arranged;
   wherein the reaction enthalpy or the chemical activity between the catalytically active component and the NOx-storing component is low at least up to temperatures of 600° C.

2. A storage catalyst according to claim 1, wherein A is one or more elements selected from the group consisting of Mg, Ca, Mn, Fe, Ni, Co, Cu, Zn, Sn and Ti and wherein B is one or more elements selected from the group consisting of Al, Ga, In, Co, Fe, Cr, Mn, Cu, Zn, Sn, Ti and Ni.

3. A storage catalyst according to claim 2, wherein A and B are not both Mn, Fe or Co.

4. A storage catalyst according to claim 1, wherein the catalytically active component is of the chemical formula $A1_{a1}A2_{a2}B_bO_4$, wherein A1 and A2 are selected from the group consisting of Mg, Ca, Mn, Fe, Ni, Co, Cu, Zn, Sn and Ti, and wherein a1+a2+b=3 and a1, a2, b>0.

5. A storage catalyst according to claim 1, wherein the catalytically active component is of the chemical formula $A1_{a1}A2_{a2}B_2O_4$, wherein A1 and A2 are selected from the group consisting of Mg, Ca, Mn, Fe, Ni, Co, Cu, Zn, Sn and Ti, and wherein $a1+a2 \leq 1$ and a1 and a2>0.

6. A storage catalyst according to claim 1, wherein the catalytically active component is of the chemical formula $A1_{0.5}A2_{0.5}B_2O_4$, wherein A1 and A2 are selected from the group consisting of Mg, Ca, Mn, Fe, Ni, Co, Cu, Zn, Sn and Ti.

7. A storage catalyst according to claim 1, wherein the catalytically active component is based on $Al_2O_3$.

8. A storage catalyst according to claim 1, wherein the storage catalyst further comprises zeolite.

9. A storage catalyst according to claim 8, wherein the catalytically active component is mixed with the zeolite or is applied to the zeolite.

10. A storage catalyst according to claim 1, wherein metal oxides of the catalytically active component form between 2 and 50% by weight of the storage catalyst.

11. A storage catalyst according to claim 10, wherein the metal oxides of the catalytically active component form between 10 and 30% by weight of the storage catalyst.

12. A storage catalyst according to claim 1, wherein the catalytically active component is a copper oxide/zinc oxide/aluminium oxide spinel of the chemical formula $Cu_AZn_CAl_DO_4$, wherein $A+C+D \leq 3$ and A>0, C>0, and D>0.

13. A storage catalyst according to claim 1, wherein the catalytically active component is a copper oxide/zinc oxide/aluminium oxide spinel of the chemical formula $Cu_{(1-c)}Zn_cAl_2O_4$, wherein 0<C<1.

14. A storage catalyst according to claim 1, wherein the catalytically active component is a copper oxide/zinc oxide/aluminium oxide spinel of the chemical formula $Cu_{0.5}Zn_{0.5}Al_2O_4$.

15. A storage catalyst according to claim 1, wherein the catalytically active component is a copper oxide/cobalt oxide/zinc oxide/aluminium oxide spinel of the chemical formula $Cu_{[1-(B+C)]}Co_BZn_CAl_2O_4$, wherein 0<(B+C)<1, with B>0 and C>0.

16. A storage catalyst according to claim 1, wherein the catalytically active component is a copper oxide/cobalt oxide/zinc oxide/aluminium oxide spinel of the chemical formula $Cu_ACo_BZn_CAl_DO_4$, wherein $A+B+C+D \leq 3$, with A>0, B>0, C>0 and D>0.

17. A storage catalyst according to claim 1, wherein the catalytically active component is a copper oxide/cobalt oxide/zinc oxide/aluminium oxide spinel of the chemical formula $Cu_{(0.5-B)}Co_BZn_{0.5}Al_2O_4$, wherein $0<B<0.5$.

18. A storage catalyst according to claim 1, wherein the catalytically active component is a copper oxide/cobalt oxide/zinc oxide/aluminium oxide spinel of the chemical formula $Cu_{0.25}Co_{0.25}Zn_{0.5}Al_2O_4$.

19. A storage catalyst according to claim 1, wherein the catalytically active component is a magnesium oxide/copper oxide/aluminium oxide spinel of the chemical formula $Mg_{(1-B)}Cu_BAl_2O_4$, wherein $0<B<1$, with $B>0$ and in particular with $B=0.5$.

20. A storage catalyst according to claim 1, wherein the storage catalyst comprises silver.

21. A storage catalyst according to claim 1, wherein the storage catalyst comprises impregnated silver.

22. A storage catalyst according to claim 1 wherein the storage catalyst further comprises one or more catalytically active elements selected from the group consisting of palladium, platinum, rhodium, ruthenium, osmium, iridium, rhenium, lanthanum, cerium, vanadium, titanium, niobium, molybdenum, tungsten, salts and oxides thereof, and mixtures thereof.

23. An internal-combustion engine according to claim 22, wherein said engine is a diesel engine or a lean-mix engine.

24. A storage catalyst according to claim 1, wherein the catalytically active component, at temperatures below an activation temperature at which the catalytic reduction of the NOx begins, is also an NOx-storing component.

25. A storage catalyst according to claim 24, wherein the catalytically active component, at temperatures above the activation temperature, releases the NOx which has previously been temporarily stored.

26. A storage catalyst according to claim 1, wherein the catalytically active component is the support material of the storage catalyst.

27. An internal-combustion engine comprising a storage catalyst according to claim 11.

28. A storage catalyst according to claim 1, wherein the reaction enthalpy or the chemical activity between the catalytically active component and the NOx-storing component is low at least up to temperatures of 800° C.

29. A method of treating an exhaust gas, comprising:
   contacting an exhaust gas containing nitrogen oxides with a storage catalyst;
   adsorbing the nitrogen oxides in the exhaust gas below a temperature with a NOx-storing component comprising 3.5–7 wt. % barium cuprate of the storage catalyst; and
   desorbing and reducing the nitrogen oxides above the temperature with a catalytically active component of the storage catalyst,
   wherein the catalytically active component is of the general chemical formula $A_aB_bO_4$, wherein A is one or more divalent metals and B is one or more trivalent metals, and wherein $a+b \leq 3$ and $a, b>0$, and
   wherein the catalytically active component is impregnated with the NOx-storing component.

30. A method according to claim 29, wherein the temperature is 100° C.

31. A storage catalyst for an exhaust gas, comprising:
   a catalytically active component for reducing nitrogen oxide at least in the presence of hydrocarbons and impregnated with a NOx-storing component comprising 3.5–7 wt. % barium cuprate;
   wherein said catalytically active component is of the general chemical formula $A_aB_bO_4$, wherein A is one or more divalent metals and B is one or more trivalent metals, and wherein $a+b \leq 3$ and $a, b>0$.

\* \* \* \* \*